United States Patent
Herges et al.

(10) Patent No.: US 9,315,179 B2
(45) Date of Patent: Apr. 19, 2016

(54) METHOD FOR CONTROLLING A BRAKE SYSTEM OF A VEHICLE WITH AN ELECTRONICALLY RGULATED REAR-AXLE BRAKE CIRCUIT AND AN PNEUMATICALLY CONTROLLED FRONT-AXLE BRAKE CIRCUIT

(75) Inventors: Michael Herges, Munich (DE); Peter Frank, Budapest (HU); Falk Hecker, Markgroeningen (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 198 days.

(21) Appl. No.: 13/700,699

(22) PCT Filed: May 25, 2011

(86) PCT No.: PCT/EP2011/058528
§ 371 (c)(1), (2), (4) Date: Apr. 2, 2013

(87) PCT Pub. No.: WO2011/147859
PCT Pub. Date: Dec. 1, 2011

(65) Prior Publication Data
US 2013/0184957 A1  Jul. 18, 2013

(30) Foreign Application Priority Data
May 28, 2010  (DE) .......................... 10 2010 021 909

(51) Int. Cl.
*B60T 8/1766* (2006.01)
*B60T 7/20* (2006.01)
(Continued)

(52) U.S. Cl.
CPC ................ *B60T 8/1766* (2013.01); *B60T 7/20* (2013.01); *B60T 8/1708* (2013.01); *B60T 8/327* (2013.01);
(Continued)

(58) Field of Classification Search
CPC .......... B60T 8/1766; B60T 8/00; B60T 8/266; B60T 8/17
USPC ................ 701/70, 76, 78, 79; 303/3, 13, 155, 303/122.15
See application file for complete search history.

(56) References Cited

U.S. PATENT DOCUMENTS

| 5,718,486 A * | 2/1998 | Vollmer ..................... B60T 8/00 303/15 |
| 6,199,961 B1 * | 3/2001 | Beck .......................... 303/116.1 |

(Continued)

FOREIGN PATENT DOCUMENTS

| CN | 1128713 | 8/1996 |
| CN | 1551845 | 12/2004 |

(Continued)

OTHER PUBLICATIONS

European Patent Office, International Preliminary Report on Patentability, dated Dec. 4, 2012, from International Patent Application No. PCT/EP2011/058528, filed on May 25, 2011.

(Continued)

*Primary Examiner* — Thomas G Black
*Assistant Examiner* — Wae Louie
(74) *Attorney, Agent, or Firm* — Kenyon & Kenyon LLP

(57) ABSTRACT

A method for controlling a brake system, which has pressure medium-activated wheel brakes and is at least partially electronic, and which is in a vehicle that includes at least two axles, including generating brake pressures for the wheel brakes on an axle in a pressure-controlled manner, and electronically regulating the brake pressures for the pressure medium-actuated wheel brakes on at least one further axle in terms of a brake pressure regulation for adjusting an actual brake pressure to a desired brake pressure. A related braking system device is also described.

18 Claims, 2 Drawing Sheets

(51) Int. Cl.
*B60T 8/17* (2006.01)
*B60T 8/32* (2006.01)
*B60T 8/34* (2006.01)
*B60T 8/36* (2006.01)
*B60T 8/88* (2006.01)
*B60T 13/66* (2006.01)
*B60T 13/68* (2006.01)
*B60T 13/74* (2006.01)

(52) U.S. Cl.
CPC ............... B60T 8/348 (2013.01); B60T 8/3605 (2013.01); B60T 8/885 (2013.01); B60T 13/662 (2013.01); B60T 13/686 (2013.01); B60T 13/745 (2013.01); *B60T 2270/402* (2013.01); *B60T 2270/403* (2013.01)

(56) References Cited

U.S. PATENT DOCUMENTS

| | | | | |
|---|---|---|---|---|
| 6,206,481 | B1 * | 3/2001 | Kaisers et al. | 303/7 |
| 6,209,966 | B1 * | 4/2001 | Mies | B60T 7/042 |
| | | | | 303/15 |
| 6,533,369 | B2 * | 3/2003 | Baumgartner | B60T 8/4081 |
| | | | | 303/11 |
| 6,644,758 | B1 | 11/2003 | Stumpe | |
| 7,008,025 | B2 * | 3/2006 | McCann | B60T 8/323 |
| | | | | 303/122.15 |
| 7,370,917 | B2 * | 5/2008 | Battistella | B60T 8/1708 |
| | | | | 303/118.1 |
| 2002/0091479 | A1 * | 7/2002 | Maruko | B60T 7/22 |
| | | | | 701/96 |
| 2003/0011240 | A1 * | 1/2003 | Dunbar | B60T 13/16 |
| | | | | 303/13 |
| 2009/0189438 | A1 | 7/2009 | Beier et al. | |
| 2010/0019565 | A1 * | 1/2010 | Broch | B60T 8/1708 |
| | | | | 303/7 |
| 2011/0175435 | A1 | 7/2011 | Wuerth et al. | |
| 2013/0184957 | A1 * | 7/2013 | Herges | B60T 7/20 |
| | | | | 701/76 |

FOREIGN PATENT DOCUMENTS

| | | |
|---|---|---|
| CN | 1922065 | 2/2007 |
| DE | 3603143 | 8/1987 |
| DE | 42 27 0844 | 2/1994 |
| DE | 196 53 264 | 6/1998 |
| DE | 198 14 867 | 12/1999 |
| DE | 199 23 4555 | 12/2000 |
| DE | 101 55 9522 | 5/2003 |
| DE | 10 2008 003380 | 7/2009 |
| DE | 10 2008 002348 | 12/2009 |
| DE | 10 2008 057529 | 5/2010 |
| EP | 1 446 3141 | 8/2004 |
| GB | 2 270 130 | 3/1994 |
| WO | 95/16594 | 6/1995 |

OTHER PUBLICATIONS

English Translation of European Patent Office, International Preliminary Report on Patentability, dated Dec. 4, 2012, from International Patent Application No. PCT/EP2011/058528, filed on May 25, 2011.
International Search Report for PCT/EP2011/058528, dated May 25, 2011.

* cited by examiner

METHOD FOR CONTROLLING A BRAKE SYSTEM OF A VEHICLE WITH AN ELECTRONICALLY RGULATED REAR-AXLE BRAKE CIRCUIT AND AN PNEUMATICALLY CONTROLLED FRONT-AXLE BRAKE CIRCUIT

FIELD OF THE INVENTION

The present invention relates to a method for controlling a brake system that is actuated by a pressure medium and is at least partially electronic, said brake system being in a vehicle that comprises at least two axles, and a brake system in accordance with the preamble of claim 9 that is controlled by a method of this type.

BACKGROUND INFORMATION

A method of this type and/or a brake system of this type is discussed for example in DE 199 23 455 A1. The brake system is totally electronically controlled and comprises a front-axle brake circuit having a 1-channel pressure regulating module for regulating axle-by-axle the brake pressures in the wheel brakes of the front axle and comprises a rear-axle brake circuit having a 2-channel pressure regulating module for regulating wheel-by-wheel the brake pressures in the wheel brakes of the rear axle, wherein a so-called electronic brake system (EBS) is achieved. The pressure regulating modules are electrically controlled by electric signals from a foot brake module and in so doing said pressure regulating modules comprise in each case a dedicated electronic control unit, an inlet valve, an outlet valve, a relay valve and a back-up valve and also a pressure sensor in order to be able to adjust in terms of a pressure regulation an actual pneumatic brake pressure that is measured with the aid of the pressure sensor to a desired brake pressure that is set in response to a request from the driver. Pressure regulating modules of this type are discussed for example in DE 42 27 084 A1.

In addition, brake systems in towing vehicles mostly also comprise a trailer control module in order to be able to electrically and pneumatically control the brakes of a trailer from the towing vehicle.

In addition, the known brake system also comprises a central electronic control unit in order to be able to achieve, in addition to ABS (anti-lock brake system), ASR (anti-slip regulation) or ESP (electronic stability program), further functions, which nowadays are conventional in conjunction with electronic brake systems, such as hill-holders, tilt-prevention, coupling-force control between the towing vehicle and the trailer or load-dependent deceleration control. However, a range of functions of this type is encumbered by a particular expenditure on components (sensors and actuators).

In contrast thereto, brake systems having a comparatively smaller range of functions and consequently also a lower construction cost are also known from the prior art, for example from DE 101 55 952 A1, in which the brake pressures generated by a foot brake valve for the front axle and the rear axle can be adjusted in each case by ABS pressure control valves independently of the driver in such a manner that only a wheel-by-wheel or axle-by-axle brake slip regulation (ABS) can be achieved by reducing, holding or increasing the pressure.

In contrast thereto the object of the invention is to develop a method for controlling a brake system and/or a brake system of the type mentioned in the introduction in such a manner that with a lowest possible expenditure a largest possible range of functions of the brake system is achieved.

This object may be achieved in accordance with the invention by the features described herein.

SUMMARY OF THE INVENTION

An aspect of the present invention resides in the fact that the brake pressures for wheel brakes on one axle, for example a front axle, are generated exclusively in a pressure controlled manner and the brake pressures for wheel brakes on at least one further axle, for example a rear axle, are electronically regulated.

In other words, a brake system is proposed, in which the brake pressures on one axle are controlled exclusively pneumatically in terms of a pressure control and only the brake pressures on at least one further axle are electronically regulated in terms of a pressure regulation. The generation of brake pressures for the wheel brakes on one axle exclusively in a pressure controlled manner is understood in this case not to mean that an electronic brake pressure regulation is superimposed on a brake circuit, in which brake pressure regulation an actual brake pressure is adjusted to a desired brake pressure. On the contrary, it is understood to mean that exclusively a pneumatic brake circuit without brake pressure regulation is provided.

As a consequence, it is possible, on the brakes of one axle that are only pneumatically controlled, to forego the components, such as pressure sensors and electronic control units, that are otherwise required for a pressure regulation.

Advantageous developments and improvements of the invention disclosed herein are provided by the features disclosed herein.

The pressure control of the wheel brakes of one axle may be supplemented in such a manner that the brake pressures for the wheel brakes on one axle are regulated in dependence upon the brake slip of the wheels of this axle, consequently this axle includes an ABS functionality. In this case, however, the control variable is not the brake pressure but rather the brake slip.

In accordance with an embodiment, electric signals that represent the brake pressures for the wheel brakes on one axle (e.g. front axle) or that represent the braking effect on the wheels of one axle are generated and in response to these electric signals the brake pressures for the wheel brakes on the at least one further axle (e.g. rear axle) are electronically adjusted to desired brake pressures.

A coupling of the two brake circuits is achieved by controlling the electrically regulated brake circuit of the at least one further axle by the electric signals that are allocated to one axle and are derived from the brake pressure or from the braking effect on this one axle. This coupling renders it possible to achieve typical functions of electronic brake systems (EBS), such as a differential slip regulation that reduces, for example, the brake pressure at the rear axle in dependence upon the differential slip, a parking brake, a hill holder, an accumulation assistor, a control for avoiding a forward-tilting of the towing vehicle (tilt prevention) or a coupling-force control between the towing vehicle and the trailer, even in the case of a brake system having a brake circuit that is only pneumatically controlled, so that the range of functions is essentially not limited in comparison to electronic brake systems.

This coupling can, for example, be achieved by virtue of the fact that the foot brake valve generates the brake pressures for the wheel brakes on one axle, for example the front axle, wherein these brake pressures are measured by a pressure sensor in order to generate electrical signals that represent the brake pressures for the wheel brakes on one axle.

Alternatively, the electric signals that represent the brake pressures for the wheel brakes on one axle can also be determined from the position of a brake value indicator of the foot brake valve and from a characteristic curve or from the differential slip that prevails between one axle and at least one further axle during a brake application.

Last but not least, the braking effect caused by the brake pressure on one axle, for example by wheel speed sensors, can be measured on this one axle and introduced into the electronic control unit, which then correspondingly controls the electric brake circuit of at least one further axle.

In addition to the brake pressures for the wheel brakes on one axle, also other factors, such as the laden state, the axle loads, the differential slip between the axles and also the lining wear, can be decisive for the generation of the brake pressures for the wheel brakes of at least one further axle.

Control or back-up pressures for the wheel brakes on at least one further axle (e.g. rear axle) may also be generated by the foot brake valve or the foot brake module, from which in the event of a failure of the electronic brake pressure regulation for this at least one further axle or in the event of a loss of the front-axle brake pressure it is possible to generate the brake pressures for this at least one further axle in a solely pressure medium-controlled manner. Consequently, the rear-axle brake circuit on the one hand can be electronically regulated by the electric signals that are based on the front-axle brake pressures and/or on the front-axle braking effect and on the other hand it can also be pressure medium-controlled by the control or back-up pressures that are generated in parallel, as a consequence of which a two-circuit control of the rear-axle brake circuit and an underlying safety level are produced for the case that the electronic brake pressure regulation for the rear axle fails and/or there is a loss of front-axle brake pressure itself.

The brake pressures for wheel brakes of a trailer of the vehicle may be generated at least in response to the electric signals that represent the brake pressures for the wheel brakes on one axle (e.g. front axle) or that represent the braking effect on the wheels of one axle.

For the case that it is not possible to generate electric signals that represent the brake pressures for the wheel brakes on one axle (e.g. front axle) or that represent the braking effect on the wheels of one axle because, for example, the electronics have failed, it is possible to generate the brake pressures for the wheel brakes of the trailer which may be also directly in dependence upon the brake pressures for the wheel brakes on one axle (e.g. front axle), in other words also by a pressure control alone.

The reason for this is that in the event of a failure of the electronics, the brake pressures for the wheel brakes of the trailer are generated in dependence upon the brake pressures for the wheel brakes on one axle (e.g. front axle) in terms of a pressure control.

Alternatively or in addition thereto, for the case that it is not possible to generate electric signals that represent the brake pressures for the wheel brakes on one axle (e.g. front axle) or that represent the braking effect on the wheels of one axle, it is also possible to generate the brake pressures for the wheel brakes of the trailer in dependence upon the back-up pressures for the wheel brakes of the at least one further axle (e.g. rear axle). This back-up pressure control is then, however, electro-pneumatic as explained below.

If the control by the back-up pressure of the at least one further axle fails, then it is still possible to generate the trailer brake pressure on the basis of the brake pressure at one axle and/or on the basis of the electric signals that represent this brake pressure or that represent the braking effect on one axle.

As a consequence, the at least two-circuit control of the trailer brakes as required by legislation is achieved.

The invention also relates to a brake system that is actuated by a pressure medium and is at least partially electronic, said brake system being in a vehicle that comprises at least two axles and said brake system being controlled by the above described method. The brake system comprises at least:

a) a foot brake valve or a foot brake module that in response to an actuation by the driver directly generates brake pressures for the wheel brakes of one axle, b) at least one pressure regulating module that in response to the brake requirement signals from the foot brake valve or from the foot brake module electronically regulates the brake pressures for the wheel brakes on the at least one further axle.

A generating arrangement for generating electric signals that represent the brake pressures for the wheel brakes on one axle or that represent the braking effect on the wheels on one axle may be provided, wherein the pressure regulating module in response to these electric signals electronically regulates the brake pressures for the wheel brakes on the at least one further axle. This regulation is understood to mean a brake pressure regulation. In other words, an actual brake pressure is adjusted to a desired brake pressure.

The generating arrangement for generating the electric signals that represent the brake pressures for the wheel brakes on one axle or that represent the braking effect on the wheel brakes on one axle comprise, for example, one of or a plurality of the following:

a) at least one pressure sensor for measuring the brake pressures that are generated by the foot brake valve for the wheel brakes on one axle, or b) at least one electric channel of the foot brake module, c) wheel speed sensors for measuring the braking effect on the wheel brakes of one axle on the basis of the brake pressures prevailing there.

The at least one pressure regulating module for the wheel brakes of the at least one further axle (e.g. rear axle) is then embodied in such a manner that, in the event that the electronic regulation fails, said pressure regulating module regulates the brake pressures for the wheel brakes on the at least one further axle in dependence upon the control or back-up pressures.

In order to provide an ABS-functionality on one axle (e.g. front axle) there may be provided for each wheel a pressure control valve, a wheel speed sensor and an electronic control unit having an electronic brake slip regulation.

In order to achieve the abovementioned functionalities with respect to the control of the trailer brakes, in addition a trailer control module may be provided that generates the brake pressures for the wheel brakes of the trailer in response to the electrical signals that represent the brake pressures for the wheel brakes on one axle (e.g. front axle) or that represent the braking effect on the wheels of one axle, in dependence upon the brake pressures for the wheel brakes on one axle (e.g. front axle) or in dependence upon control or back-up pressures for the wheel brakes of the at least one further axle (e.g. rear axle). The control or back-up pressures for the wheel brakes of the at least one further axle (e.g. rear axle) are in so doing directly generated by the foot brake valve or foot brake module.

In accordance with an embodiment, the at least one pressure regulating module of the rear axle comprises at least one integrated pressure sensor that generates the electric signals that represent the control or back-up pressures for the wheel brakes of the at least one further axle (e.g. rear axle), in response to which electric signals the brake pressures for the wheel brakes of the trailer are then generated in the trailer control module, as already described above.

In accordance with a further embodiment, the purely pneumatically controlled axle could be a rear axle and the at least one further axle having electronic brake pressure regulation could be a front axle.

Additional measures that improve the invention are explained in detail hereinunder with reference to the drawing together with the description of exemplary embodiments of the invention.

DETAILED DESCRIPTION

Figure 1:
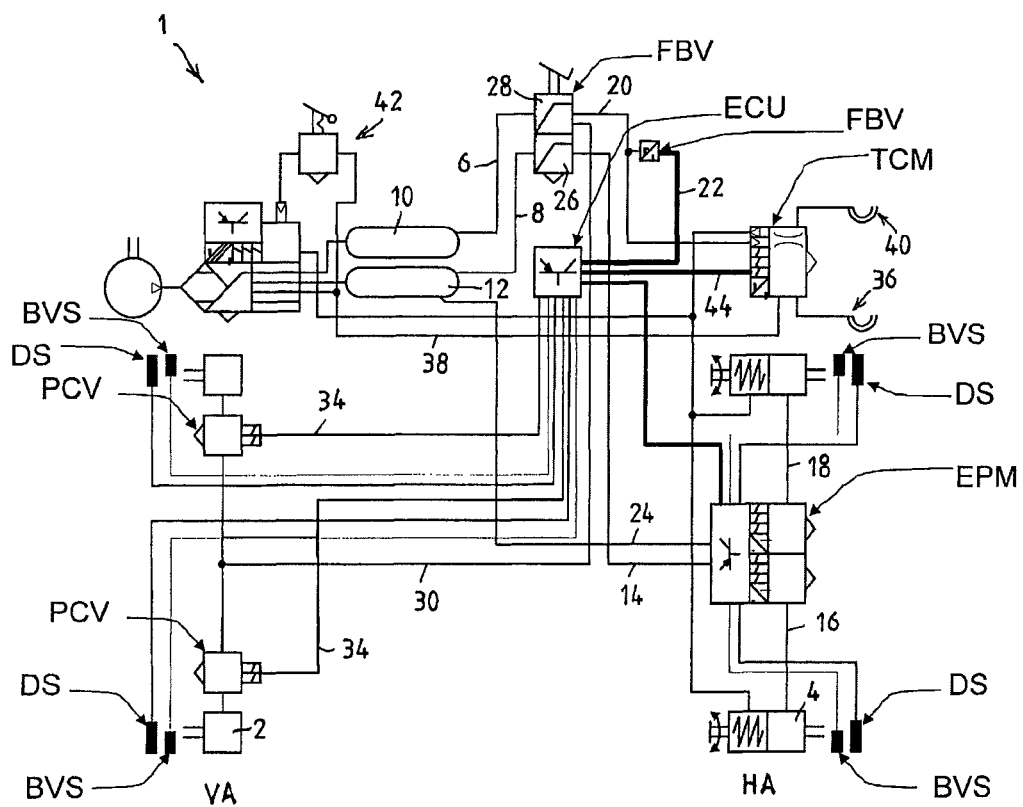
FIG. 1 shows a schematic diagram of an embodiment of a brake system of a vehicle in accordance with the invention.

The exemplary embodiment, illustrated in FIG. 1, of a brake system 1 that is actuated by a pressure medium is used to decelerate a towing vehicle that is also suitable for trailer operation.

The brake system 1 may be embodied in an electro-pneumatic manner and comprises a two-channel pneumatic foot brake valve FBV that in response to an actuation by the driver generates for a front-axle brake circuit brake pressures for wheel brakes 2 of a front axle VA, and for a rear-axle brake circuit generates control and/or back-up pressures for wheel brakes 4 of a rear axle HA. For this purpose, compressed air that is subjected to storage pressure is directed from a front-axle compressed air reservoir 10 and a rear-axle compressed air reservoir 12 to the foot brake valve FBV by way of the emergency supply lines 6, 8.

In detail, the back-up pressure generated by the foot brake valve FBV is directed by way of a pressure line 14 to a 2-channel pressure regulating module EPM of the rear axle HA, which pressure regulating module that is pressure controlled by the control and/or back-up pressure $p_{HA}$ regulates for each side by way of a brake line 16, 18 a rear-axle brake pressure for a service brake cylinder of a combi-cylinder 4 that also comprises a spring-type brake actuator. However, the generation of the rear-axle brake pressure, which generation is controlled pneumatically by the back-up pressure, is subordinate with regard to an electric control of the 2-channel pressure regulating module EPM by an electronic control unit ECU. For this purpose, measuring may be done by way of a pressure sensor PS the front-axle brake pressure $p_{VA}$ that is conveyed from the foot brake valve FBV in a pressure line 20 to a trailer control module TCM and to generate an electric signal that represents this pressure, which electric signal is then introduced by way of an electric line 22 into the electronic control unit ECU. In response to the electrical signals, said electronic control unit in turn then controls the 2-channel pressure regulating module EPM in order to modulate a rear-axle brake pressure from the storage pressure obtained by way of an emergency supply line 24 from the compressed air reservoir 12 of the rear-axle brake circuit.

The 2-channel pressure regulating module EPM comprises a dedicated electronic control unit and for each channel (right side, left side) in each case an inlet valve, an outlet valve, a relay valve, a back-up valve and a pressure sensor in order to be able to adjust, in terms of a pressure regulation, an actual pneumatic rear-axle brake pressure that is measured with the aid of the pressure sensor to a desired rear-axle brake pressure that is represented by the electric signal that is controlled by the electronic control unit ECU.

In the event that the electronic control unit ECU cannot perform an electric control, for example owing to a malfunction of the electrical brake circuit or owing to a loss of the front-axle brake pressure (e.g. as a result of leakage), then the integrated back-up valve connects the control and/or back-up pressure $p_{HA}$ obtained from the rear-axle channel 26 of the foot brake valve FBV by way of the pressure line 14 to the control input of the integrated relay valve in order to generate a corresponding rear-axle brake pressure. 2-channel pressure regulating modules EPM of this type are known, for example, from DE 42 27 084 A1.

The front-axle brake pressure that is generated in the front-axle channel 28 of the foot brake valve FBV is used in addition to the pneumatic control of the trailer control module TCM primarily to ventilate the wheel brake cylinder 2 of the front axle VA by a pressure line 30. An ABS pressure control valve PCV is connected in this pressure line 30 preferably for each side in order to be able to adjust an optimal brake slip from the brake slip that prevails in each case at the relevant front wheel. For this purpose, the ABS pressure control valves PCV are controlled by electric lines 34 from the electronic control unit ECU in which ECU the ABS-functionality is implemented. The brake slip regulation is performed in this case by cyclically increasing, holding or reducing pressure in a known manner. In this case, the electronic control unit ECU receives the necessary information by way of the already prevailing brake slip and/or the current vehicle velocity by way of the wheel speed sensors DS.

The braking effect caused by the brake pressure $p_{VA}$ on the front axle VA is also measured by the wheel speed sensors DS on the front axle VA and introduced into the electronic control unit ECU in order to be able to control the electric rear-axle brake circuit alternatively to or also in response to the signals then generated by the electronic control unit ECU, for example in terms of a differential slip regulation.

The trailer control module TCM generates in a service-line hose coupler 36 a pneumatic control pressure for the wheel brakes, not illustrated in this case, of the trailer. On the other hand, the trailer control module feeds into an emergency-line hose coupler 40 a storage pressure that is obtained from the compressed air reservoir 12 for the rear axle by way of an emergency supply line 38.

The braking effect of the spring-type brakes of the combi-cylinder 4 of the rear axle HA can be effected by way of a parking brake device 42 that is of no interest in this case, and the braking effect of the service brakes of the trailer can be effected by way of the trailer control module TCM.

As is the case with the 2-channel pressure regulating module EPM of the rear axle HA, the trailer control module TCM is also controlled on the one hand electrically and on the other hand pneumatically in order to provide the required 2-circuit control. The pneumatic control is performed, in part, by the front-axle brake pressure $p_{VA}$ as already described above and the electric control is performed in response to the electric signals that represent the front-axle brake pressure $p_{VA}$. For this purpose, the trailer control module TCM is connected by way of an electric line 44 to the electronic control unit ECU, which processes the signals from the pressure sensor PS that is measuring the front-axle brake pressure $p_{VA}$.

The pressure line 20 between the front-axle channel 28 and the corresponding pressure input of the trailer control module TCM renders it possible, for the case that it is not possible to generate the electric signals that represent the front-axle brake pressure $p_{VA}$, because for example, the electrics have failed, that the brake pressures for the wheel brakes of the trailer are generated directly in dependence upon the front-axle brake pressure $p_{VA}$, i.e. by a pure pressure control.

In addition, the trailer control module TCM can be controlled in dependence upon the control and/or back-up pressure $p_{HA}$ of the rear axle HA. For this purpose, the control or back-up pressure $p_{HA}$ of the rear axle HA is measured by the pressure sensor PS that is integrated in the 2-channel pressure regulating module EPM of the rear axle HA and electric signals that represent said pressure are generated and introduced into the electronic control unit ECU that in turn generates therefrom electric control signals for the trailer control module TCM in order then likewise to generate at the service-line hose coupler 36 brake pressures for the wheel brakes of the trailer.

Therefore, for the case that it is not possible to generate an electric signal that represents the front-axle brake pressure, for example owing to the loss of the front-axle brake pressure $p_{VA}$, the brake pressures for the wheel brakes of the trailer are also generated in dependence upon the rear-axle back-up pressure $p_{HA}$, however, said brake pressures are then generated by way of an electric circuit that comprises the electronic control unit ECU.

If, on the other hand, the electric control fails, then it is possible to generate the trailer brake pressure directly in dependence upon the front-axle brake pressure $p_{VA}$.

In addition, signals from the brake lining wear sensors BVS that are arranged wheel-by-wheel are introduced into the electronic control unit in order to deliver this information regarding the current actual brake pressure and the wear status of the brake linings.

Last but not least, the pneumatic hysteresis of the foot brake valve FBV at the rear axle HA can be compensated in an electronic manner by short-duration increases or reductions of pressure (negative hysteresis). As a consequence, brake-sensing as performed in a passenger car is also possible in the case of commercial vehicles.

In addition, the pressure-reduction gradients can be supported by way of the pressure control valves PCV, as a consequence of which short release times are possible, in particular at the front axle VA.

Figure 2:
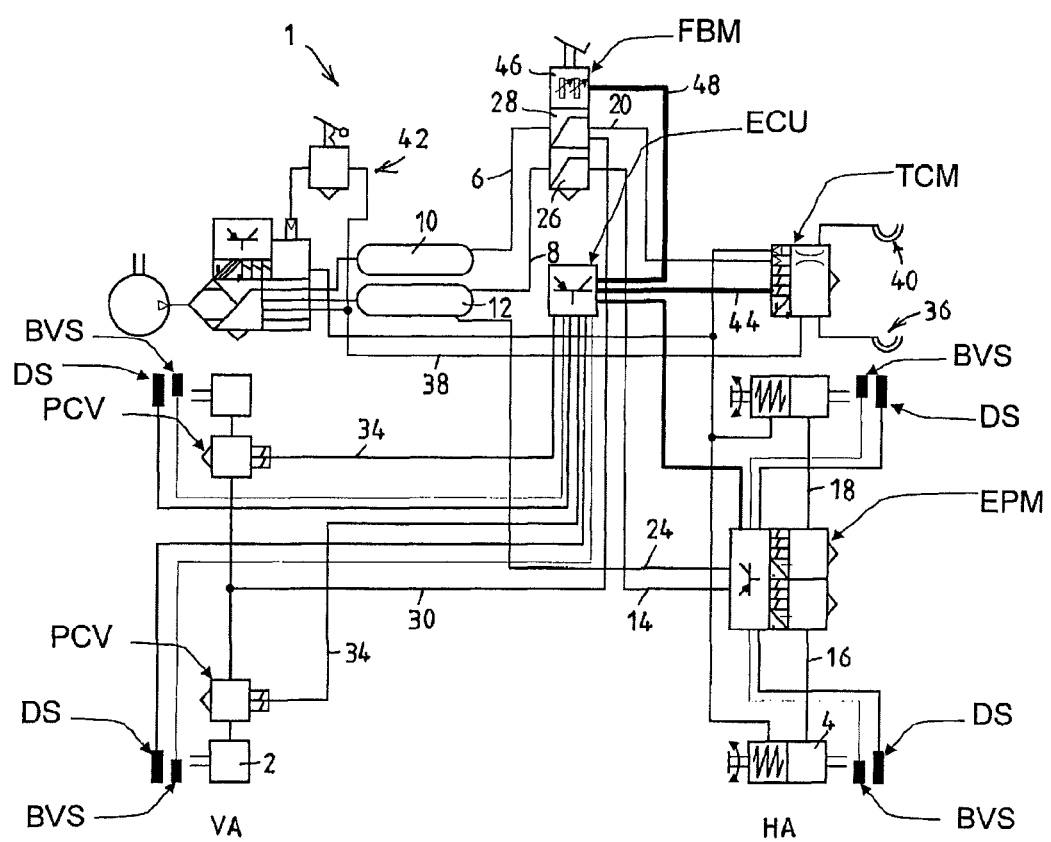
FIG. 2 shows a schematic diagram of a further embodiment of a brake system of a vehicle in accordance with the invention.

In the case of the embodiment illustrated in FIG. 2, components and assemblies that are identical and/or function in a similar manner with regard to the exemplary embodiment illustrated in FIG. 1 are characterized by like reference numerals. As distinguished from the embodiment illustrated in FIG. 1, the brake system in accordance with FIG. 2 does not comprise a foot brake valve FBV, on the contrary, it comprises a foot brake module FBM having a dedicated electric channel 46 having an electric signal line 48 to the electronic control unit ECU and electric signals that are in dependence upon the level of actuation are generated in said ECU in parallel with the pneumatic signals in the rear-axle channel 26 and in the front-axle channel 28.

Instead of by the pressure sensor PS illustrated in FIG. 1, the electric signals that represent the brake pressure $p_{VA}$ for the wheel brakes 2 on the front axle VA are therefore generated by the electric channel 46 of the foot brake module FBM. In parallel therewith, the wheel speed sensors DS are used to determine the braking effect on the front axle VA on the basis of the brake pressure $p_{VA}$. Using these electric signals that are introduced into the electronic control device ECU, the electric rear-axle brake circuit and/or the trailer control module are then controlled in the same manner as the embodiment described above.

LIST OF REFERENCE NUMERALS

BVS Brake lining wear sensor
DS Wheel speed sensor
ECU Electronic control unit
EPM Pressure regulating module
FBV Foot brake valve
FBM Foot brake module
PS Pressure sensor
PCV ABS-pressure control valve
VA Front axle
HA Rear axle
$p_{HA}$ Control or back-up pressure rear axle
$p_{VA}$ Brake pressure front axle
1 Brake system
2 Wheel brakes
4 Wheel brakes
6 Emergency supply line
8 Emergency supply line
10 Compressed air reservoir
12 Compressed air reservoir
14 Pressure line
16 Brake line
18 Brake line
20 Pressure line
22 Electric line
24 Emergency supply line
26 Rear-axle channel
28 Front-axle channel
30 Pressure line
34 Electric line
36 Service-line hose coupler
38 Emergency supply line
40 Emergency-line hose coupler
42 Parking brake device
44 Electric line
46 Electric channel
48 Signal line

The invention claimed is:

1. A method for controlling a brake system, which has pressure medium-activated wheel brakes, and which is in a vehicle that includes at least two axles, the method comprising:
    pneumatically generating brake pressures, via a pneumatic brake circuit, for the medium-activated wheel brakes on a front axle in a pressure-controlled manner, wherein the pneumatic brake circuit includes no brake pressure regulation based on a pressure sensor or electronic control; and
    electronically regulating, via an electrically regulated brake circuit, the brake pressures for the pressure medium-activated wheel brakes on at least one rear axle in terms of a brake pressure regulation for adjusting an actual brake pressure to a desired brake pressure;
    coupling the pneumatic brake circuit and the electrically regulated brake circuit by controlling the electrically regulated brake circuit of the at least one rear axle by electric signals that are allocated to the front axle and are derived from the brake pressure or from the braking effect on the front axle.

2. The method of claim 1, wherein the brake pressures for the wheel brakes on one axle are regulated in dependence upon the brake slip of the wheels of this axle.

3. The method of claim 1, wherein electric signals are generated that represent the brake pressures for the wheel brakes on one axle or that represent the braking effect on the wheels of one axle.

4. The method of claim 3, wherein the brake pressures for the wheel brakes on the at least one further axle are brake-pressure regulated at least in response to the electric signals that represent the brake pressures for the wheel brakes on one axle or that represent the braking effect on the wheels on one axle.

5. The method of claim 1, wherein control or back-up pressures for the wheel brakes on the at least one further axle are generated, from which in the event of a failure of the electronic brake pressure regulation for this at least one further axle the brake pressures for this at least one further axle are generated in a pressure medium-controlled manner.

6. The method of claim 3, wherein the brake pressures for wheel brakes of a trailer of the vehicle are generated at least in response to the electric signals that represent the brake pressures for the wheel brakes on one axle or that represent the braking effect on the wheels on one axle.

7. The method of claim 6, wherein for the case that it is not possible to generate electric signals that represent the brake pressures for the wheel brakes on one axle or that represent the braking effect on the wheels of one axle the brake pressures for the wheel brakes of the trailer are generated directly in dependence upon the brake pressures for the wheel brakes on an axle.

8. The method of claim 3, wherein for the case that it is not possible to generate electric signals that represent the brake pressures for the wheel brakes on one axle or that represent the braking effect on the wheels of one axle the brake pressures for the wheel brakes of the trailer are generated in dependence upon the control or back-up pressures for the wheel brakes of the at least one further axle.

9. A brake system device, which is actuated by a pressure medium, and which is in a vehicle that includes at least two axles, comprising:
  a foot brake valve or a foot brake module that pneumatically generates brake pressures, via a pneumatic brake circuit, for wheel brakes of a front axle in response to an actuation by the driver, wherein the pneumatic brake circuit includes no brake pressure regulation based on a pressure sensor or electronic control; and
  at least one pressure regulating module, which in response to brake demand signals from the foot brake valve or from the foot brake module electronically regulates, via an electrically regulated brake circuit, brake pressures for wheel brakes on at least one rear axle axle in terms of a brake pressure regulation in order to adjust an actual brake pressure to a desired brake pressure;
  wherein the pneumatic brake circuit and the electrically regulated brake circuit are coupled by controlling the electrically regulated brake circuit of the at least one rear axle by electric signals that are allocated to the front axle and are derived from the brake pressure or from the braking effect on the front axle.

10. The device of claim 9, further comprising:
  a generating arrangement for generating electric signals that represent the brake pressures for the wheel brakes on one axle or that represent the braking effect on the wheels of one axle, wherein the pressure regulating module in response to these electric signals electronically regulates the brake pressures for the wheel brakes on the at least one further axle.

11. The device of claim 10, wherein the generating arrangement includes at least one of: (i) at least one pressure sensor for measuring the brake pressures that are generated by the foot brake valve for the wheel brakes on one axle; (ii) at least one electric channel of the foot brake module; and (iii) wheel speed sensors for measuring the braking effect on the wheel brakes of one axle based on the brake pressures prevailing there.

12. The device of claim 9, wherein the at least one pressure regulating module for the wheel brakes of the at least one further axle is embodied so that it generates the brake pressures for the wheel brakes on the at least one further axis in the event of a failure of the electronic regulation in dependence upon control or back-up pressures for this axle.

13. The device of claim 12, wherein a trailer control module generates brake pressures for the wheel brakes of a trailer of the vehicle in response to the electric signals that represent the brake pressures for the wheel brakes on one axle or that represent the braking effect on the wheels on one axle, directly in dependence upon the brake pressures for the wheel brakes on one axle or in dependence upon the control or back-up pressures for the wheel brakes of the at least one further axle.

14. The device of claim 13, wherein the at least one pressure regulating module includes at least one integrated pressure sensor that generates electric signals that represent the control or back-up pressures for the wheel brakes of the at least one further axle, in response to which electric signals the brake pressures for the wheel brakes of the trailer are generated in the trailer control module.

15. The device of claim 9, wherein by at least one pressure control valve, a wheel speed sensor and an electronic control unit provide for the brake slip regulation of the brake pressures for the wheel brakes on one axle.

16. The device of claim 9, wherein one axle is a front axle and the at least one further axle is a rear axle.

17. The device of claim 9, wherein one axle is a rear axle and the at least one further axle is a front axle.

18. A vehicle, comprising:
  a brake system device, which is actuated by a pressure medium, and which is in a vehicle that includes at least two axles, including:
    a foot brake valve or a foot brake module that pneumatically generates brake pressures, via a pneumatic brake circuit, for wheel brakes of a front axle in response to an actuation by the driver, wherein the pneumatic brake circuit includes no brake pressure regulation based on a pressure sensor or electronic control; and
    at least one pressure regulating module, which in response to brake demand signals from the foot brake valve or from the foot brake module electronically regulates, via an electrically regulated brake circuit, brake pressures for wheel brakes on at least one rear axle in terms of a brake pressure regulation to adjust an actual brake pressure to a desired brake pressure;
    coupling the pneumatic brake circuit and the electrically regulated brake circuit by controlling the electrically regulated brake circuit of the at least one rear axle by electric signals that are allocated to the front axle and are derived from the brake pressure or from the braking effect on the front axle.

* * * * *